United States Patent [19]
Kouznetsov

[11] Patent Number: 6,029,256
[45] Date of Patent: Feb. 22, 2000

[54] METHOD AND SYSTEM FOR ALLOWING COMPUTER PROGRAMS EASY ACCESS TO FEATURES OF A VIRUS SCANNING ENGINE

[75] Inventor: Viktor Kouznetsov, Aloha, Oreg.

[73] Assignee: Network Associates, Inc., Santa Clara, Calif.

[21] Appl. No.: 09/001,610

[22] Filed: Dec. 31, 1997

[51] Int. Cl.[7] .................................................. G06F 11/00
[52] U.S. Cl. ................................................................ 714/38
[58] Field of Search ............................ 714/38, 39; 380/4, 380/3; 713/200, 201, 202

[56] References Cited

U.S. PATENT DOCUMENTS

| | | | |
|---|---|---|---|
| 5,408,642 | 4/1995 | Omrimann | 395/575 |
| 5,440,723 | 8/1995 | Arnold et al. | 395/181 |
| 5,452,442 | 9/1995 | Kephart | 395/183.14 |
| 5,502,815 | 3/1996 | Cozza | 395/183.14 |
| 5,537,540 | 7/1996 | Miller et al. | 395/183.14 |
| 5,559,960 | 9/1996 | Lettvin | 395/186 |
| 5,696,822 | 12/1997 | Nachenberg | 380/4 |
| 5,822,517 | 10/1998 | Dotan | 395/186 |
| 5,826,013 | 10/1998 | Nachenberg | 395/186 |
| 5,907,834 | 5/1999 | Kephart et al. | 706/20 |
| 5,918,008 | 6/1999 | Togawa et al. | 395/186 |

*Primary Examiner*—Joseph E. Palys
*Assistant Examiner*—E Gunderson
*Attorney, Agent, or Firm*—Pennie & Edmonds LLP

[57] ABSTRACT

A system and method for allowing computer programs to directly access various features of a virus scanning engine is disclosed. In one embodiment of the invention, the system includes a module for instantiating an object to act as an interface between the computer program and the virus scan engine, a module for setting properties of the object that are associated with the desired feature of the virus scan engine to be accessed, a module for invoking a method of the object, the invocation resulting in access to the desired feature of the virus scan engine, and a module for examining properties of the object after the desired feature of the virus scan engine has been accessed.

20 Claims, 3 Drawing Sheets

```
Sub ActionExample ( )
    Dim nAction As Long
    ' set the property
    VirusInterface.Action = 1
    ' get the property
    nAction = VirusInterface.Action
End Sub
```
*Fig. 3*

```
Sub FileExample ( )
    Dim sFile As String
    ' set the property
    VirusInterface.File = "C:\SomeFile.exe"
    ' get the property
    sFile = VirusInterface.File
End Sub
```
*Fig. 4*

```
Sub InfectedExample ( )
    Dim nInfected As Long
    ' get the property
    nInfected = VirusInterface.Infected
End Sub
```
*Fig. 5*

```
Sub MoveToPathExample ( )
    Dim sMoveToPath As String

' set the property
    VirusInterface.MoveTopPath = "C:\TopDir\SubDir"

' get the property
    sMoveToPath = VirusInterface.MoveToPath
End Sub
```
*Fig. 6*

```
Sub RepairableExample ( )
    Dim nRepairable As Long

' get the property
    nRepairable = VirusInterface.Repairable
End Sub
```
*Fig. 7*

```
Sub ResultExample ( )
    Dim nResult As Long

' get the property
    nResult = VirusInterface.Result
End Sub
```

*Fig. 8*

```
Sub TypeExample ( )
    Dim nType As Long

' get the property
    nType = VirusInterface.Type
End Sub
```

*Fig. 9*

```
Sub VirusNameExample ( )
    Dim sVirusName As String

' get the property
    sVirusName = VirusInterface.VirusName
End Sub
```

*Fig. 10*

```
Sub ScanExample ( )
    VirusInterface.Action = 1
    VirusInterface.File = "C:\SomeFile.exe"
    VirusInterface.Scan If VirusInterface.Result = 0 Then
        ' succeeded
        Infected = VirusInterface.Infected
        Repairable = VirusInterface.Repairable
        Type = VirusInterface.Type
        VirusName = VirusInterface.VirusName
    End If
End Sub
```

*Fig. 11*

METHOD AND SYSTEM FOR ALLOWING COMPUTER PROGRAMS EASY ACCESS TO FEATURES OF A VIRUS SCANNING ENGINE

BACKGROUND OF THE INVENTION

1. Technical Field

The present invention relates generally to computer systems and computer viruses associated therewith. Specifically, the present invention relates to a method and system for allowing computer applications to directly access various features of a virus scanning engine without the need for user intervention.

2. Discussion of the Related Art

The generation and spread of computer viruses is a major problem in modern day computing. Generally, a computer virus is a program capable of attaching to other programs or sets of computer instructions, replicating itself, and performing unsolicited or malicious actions on a computer system utilizing the infected program. Computer viruses are designed to spread by attaching to programs on floppy disks or other computer-readable media, or to data transmissions between computer users, and are designed to inflict damage while remaining undetected. The damage done by computer viruses may range from mild interference with a program, such as the display of an unwanted message in a dialog box, to the complete destruction of data on a user's hard drive. It is estimated that new viruses are created at a rate of over one hundred per month.

A variety of methods have been developed to detect and destroy computer viruses. As is known in the art, one common method of detecting viruses is to use a virus scanning engine to scan for known computer viruses in, for example, executable files, application macro files, or disk boot sectors. Generally, computer viruses include identifiable binary sequences that may be referred to as "virus signatures." Upon the detection of a virus signature by the virus scanning engine, a virus disinfection program may then be used to extract the harmful information from the infected code, thereby disinfecting that code. Common virus scanning engines allow, for example, boot-sector scanning upon system bootup or on-demand scanning of programs or files at the explicit request of the user.

Historically, a user running a computer application such as a word processor has had to perform a series of cumbersome procedures to have a particular file, to be accessed by the application in use, scanned for viruses. In particular, the user has heretofore been required to call up the file to be accessed, call up a virus scanning engine, execute the virus scanning engine to scan the subject file, and then import the file, once scanned, into the word processor. This process is, of course, inefficient and results in time unnecessarily wasted.

SUMMARY OF THE INVENTION

It is therefore an object of the invention to provide a system and method for allowing computer applications to directly access various features of a virus scanning engine in an efficient manner without the need for user intervention.

In accordance with this and other objects of the present invention, a system and method for allowing computer programs to directly access various features of a virus scanning engine is provided. In an exemplary embodiment of the invention, the system includes a means for instantiating an object to act as an interface between the computer program and the virus scan engine, a means for setting properties of the object that are associated with the desired feature of the virus scan engine to be accessed, and a means for invoking a method of the object such as scan, the invocation resulting in access to the desired feature or features of the virus scan engine.

In another embodiment of the invention, the system additionally includes a means for examining properties of the object after the desired feature of the virus scan engine has been accessed. Illustrative examples of properties include action, file, infected, move to path, repairable, result, type, and virus name.

BRIEF DESCRIPTION OF THE DRAWINGS

These and other features, aspects, and advantages of the present invention will become more readily apparent from the following detailed description, which should be read in conjunction with the following drawings, in which:

FIG. 3 is a Visual Basic subroutine illustrating use of the action property;

FIG. 4 is a Visual Basic subroutine illustrating use of the file property;

FIG. 5 is a Visual Basic subroutine illustrating use of the infected property;

FIG. 6 is a Visual Basic subroutine illustrating use of the move to path property;

FIG. 7 is a Visual Basic subroutine illustrating use of the repairable property;

FIG. 8 is a Visual Basic subroutine illustrating use of the result property;

FIG. 9 is a Visual Basic subroutine illustrating use of the type property;

FIG. 10 is a Visual Basic subroutine illustrating use of the virus name property; and FIG. 11 is a Visual Basic subroutine illustrating use of the scan method.

DETAILED DESCRIPTION OF THE INVENTION

Figure 1:
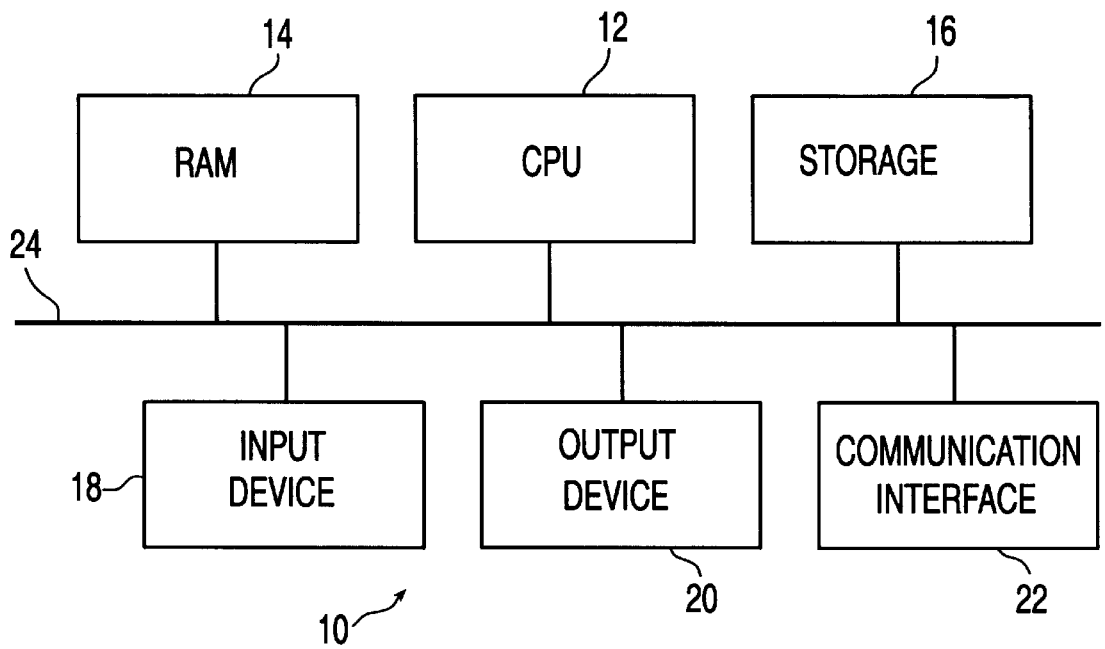
FIG. 1 is a block diagram of a representative computer system in conjunction with which the present invention may be practiced.

The following embodiments of the present invention will be described in the context of a system and method for allowing applications easy access to features of a virus scanning engine, although those skilled in the art will recognize that the disclosed methods and structures are readily adaptable for broader application. Note that whenever the same reference numeral is repeated with respect to different figures, it refers to the corresponding structure in each such figure.

FIG. 1 discloses a representative computer system in conjunction with which an embodiment according to the present invention may be implemented. Computer system 10 may be a personal computer or workstation, or a larger system such as a minicomputer. However, one skilled in the art of computer systems will understand that the present invention is not limited to a particular class or model of computer.

As shown in FIG. 1, representative computer system 10 includes a central processing unit (CPU) 12, a memory unit 14, one or more storage devices 16, an input device 18, an output device 20, and communication interface 22. A system bus 24 is provided for communications between these elements. Computer system 10 may additionally function through use of an operating system (not shown), such as WINDOWS, DOS, or UNIX.

Storage devices 16 may illustratively include one or more floppy or hard disk drives, CD-ROMs, DVDs, or tapes. Input device 18 comprises a keyboard, mouse, microphone, or other similar device. Output device 20 is a computer monitor or any other known computer output device. Communication interface 22 may be a modem, a network interface, or other connection to external electronic devices, such as a serial or parallel port.

Figure 2:
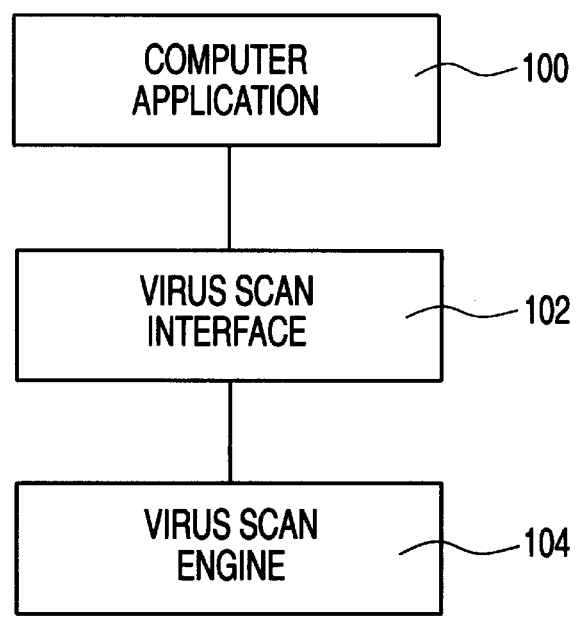
FIG. 2 is a block diagram according to the present invention illustrating the interaction between a computer application, a virus scan interface, and a virus scan engine.

Referring now to FIG. 2, a system is disclosed wherein a computer program or application 100 run by a user on computer system 10, for example, utilizes a virus scan interface 102 to directly access a virus scan engine 104. Computer application 100 may be any known computer application, such as a wordprocessor, database, or spreadsheet, but by way of example, and not by way of limitation, will be described herein as a word processor.

Virus scan engine 104 may be any of the variety of virus scan engines known in the art. However, again by way of example, and not by way of limitation, virus scan engine 104 will be described herein as VirusScan™, produced by McAfee Associates. It is emphasized that this example, as with the use of a word processor as an example of a computer application, is presented only for clarity of presentation, and does not limit the scope or context of the invention to certain software packages, software types, or operating system types. Indeed, the preferred embodiment of the invention is advantageously applied to many different types of virus scanning engines and computer applications on many different types of operating systems and computing configurations.

VirusScan™ is a virus scan engine offered for sale in a variety forms. VirusScan™ is described in documentation in printed form (see, e.g., "VirusScan Quick Start Guide", McAfee Associates 1997, accompanying the CD-ROM version of VirusScan for Windows 95, NT, 3.1x, DOS and OS/2), in computer-readable form (see, e.g., the directory \MANUALS on the CD-ROM version of VirusScan for Windows 95, NT, 3.1x, DOS and OS/2), and on McAfee's Internet site at http://www.mcafee.com. The content of this documentation is hereby incorporated by reference into the present application.

In one form, the VirusScan™ application is adapted for use on a user's computer running on a Windows 95™ platform. A main routine used by this antivirus application is "SCAN.EXE", a program file that is typically placed in the directory C:\PROGRAM_FILES\MCAFEE\VIRUSSCAN on the user's hard drive. The program SCAN.EXE is adapted to be used for any of the following types of virus scanning: virus scanning of system boot-sectors at startup, on-demand virus scanning at the explicit request of the user, and on-access virus scanning of a file when that file is accessed by the operating system or an application. In the Windows 95™ environment, the registry files are often modified such that SCAN.EXE is run at computer startup, and also remains resident for scanning all files upon file access.

In a typical configuration, VirusScan™ is used in conjunction with a set of virus signature files having the names CLEAN.DAT, MCALYZE.DAT, NAMES.DAT, and SCAN.DAT. As of McAfee's Oct. 15, 1997 release of version 3010 of its VirusScan™ signature file updates, these virus signature files collectively comprise over 1.6 MB of virus information. In a typical configuration, the files CLEAN.DAT, MCALYZE.DAT, NAMES.DAT, and SCAN.DAT are also placed in the directory C:\PROGRAM_FILES\MCAFEE\VIRUSSCAN on the user's hard drive. For purposes of clarity and simplicity in describing the background and preferred embodiments, this disclosure will refer to a generic antivirus program as virus scan engine 104.

According to one embodiment of the invention, virus scan interface 102 is a dynamic link library that is used by application 100 to access various features of virus scan engine 104. More particularly, virus scan interface 102 is a component object model (COM) object that exposes a set of methods and properties that can be used by computer programs or applications to perform virus scanning using virus scan engine 104, without having to understand and contend with the low-level details of virus scan engine 104. Since it is a COM object, it is language independent and may be used by any program or application that can create and call COM Objects. Access to virus scan interface 104 may illustratively be accomplished through OLE Automation (the IDispatch interface).

Virus scan interface 102 can be utilized to access virus scan engine 104 in two different ways. Because virus scan interface 102 can be made to conform to the ActiveX control specification, it can be added to a form in languages that support this paradigm, and then accessed like any other control in that environment. If used in this way, the control itself is invisible to the user at run time. Second, because virus scan interface 102 can provide its services via Automation methods and properties, any program that can create and call COM objects can perform virus scanning without having to host it as a control.

As mentioned, virus scan interface 102 is a COM object that exposes a set of methods and properties that can be employed by computer programs or applications to perform virus scanning using a virus scan engine 104. In one embodiment of the invention, virus scan interface 102 includes the following properties: action 110, file 112, infected 114, move to path 116, repairable 118, result 120, type 122, and virus name 124. Virus scan interface additionally includes a scan method 126.

FIGS. 3–11 disclose illustrative subroutines in Visual Basic for setting or getting, as appropriate, the above-listed virus interface properties, and for using scan method 126. As disclosed herein, each of these subroutines assumes either that there is a control on the current form with the ID "VirusInterface", or that there is an object variable with the name "VirusInterface, " created in Visual Basic as follows:

```
Dim VirusInterface As Object

Set VirusInterface = CreateObject
                        ("VirusInterface.Service")
```

Although these subroutines are preferably written in an object-oriented language such as Visual Basic or C++, one skilled in the art will appreciate that these subroutines may be programmed in suitable non-object-oriented computer languages without departing from the scope of the present invention.

Action property 110 specifies the operation to be performed when scan method 126 is invoked. The data type of this property is integer. Action property 110 must be set to one of the following values before scan method 126 is invoked to specify what scan operation should be performed:

| Value | Description | Other properties to Set |
|---|---|---|
| 1 | scan file for viruses | File |
| 2 | clean file of infection | File |
| 3 | delete file | File |
| 4 | move file to new directory | File, MoveToPath |

Illustratively, the subroutine disclosed in FIG. 3 sets the action property to 1, so that when scan method 126 is invoked, the method will scan the previously-indentified file for viruses.

File property 112 specifies the file name that will be the object of a scan using scan method 126, and must be set before invoking the scan method. The data type of this property is string, and indicates the path, full or relative, of a single file to be acted upon. Illustrative examples are "C:\TopDir\SubDir\MyFile.exe," "SubDir\MyFile.exe, " and "MyFile.exe." In the subroutine of FIG. 4, the file property is set to "C:SomeFile.exe, " while the variable sFile is set to that path for the purpose of getting the property Infected property 114 indicates whether a file has a virus. This property is an integer data type, and is only meaningful after a successful scan operation using scan method 126. It cannot be set by the caller. It can only be set by scanning a file. If the value is non-zero after a scan has been performed, the file is infected. FIG. 5 illustrates a means by which the caller can obtain the value of infected property 114.

The Move To Path property 116 specifies the directory name to which a file will be moved, and must be set before invoking scan method 126. This property is of a string data type, and indicates the path, full or relative, of a single directory. Illustrative examples are "C:\TopDir\SubDir," "TopDir\SubDir," and "SubDir." FIG. 6 illustrates a means by which the caller can set the value of move to path property to "C:\TopDir\SubDir," and then retrieve the property value through variable sMoveToPath.

Repairable property 118 indicates whether an infected file can be cleaned. This property is of an integer data type, and is only meaningful after a successful scan operation. It cannot be set by the caller. It can only be set by scanning a file. If the value is non-zero, the file can be repaired. FIG. 7 illustrates a means by which the caller can obtain the value of repairable property 118 using variable nRepariable.

Result property 120 indicates whether a method call succeeded or failed. This property is of an integer data type, and is only meaningful after a scan has been invoked. It cannot be set by the caller. It can only be set by invoking a method such as scan method 126. If the method call is successful, the result value will be zero. Any other value indicates a failure of some kind, in which case result property will illustrative be set to the "errno" or "LastError" that occurred, or the VSTATUS value returned from virus scan engine 104. FIG. 8 illustrates a means by which the caller can obtain the value of result property 120 using variable nResult.

Type property 122 identifies the type of virus infecting a file. This property is an integer data type, and is only meaningful after a successful scan operation. It cannot be set by the caller. It can only be set by scanning a file. Illustratively, the following values may defined:

| Value | Description |
|---|---|
| 1 | virus infects COM files |
| 2 | virus infects EXE files |
| 4 | virus infects boot sector |
| 8 | virus infects master boot record |

Advantageously, these values are additive. If the virus infects COM and EXE files, for example, type property 122 will have a value of (1+2)=3. FIG. 9 illustrates a means by which the caller can obtain the value of result property 120 using variable nType.

Virus Name property 124 identifies the virus that infects the file. This property is a string data type, and is only meaningful after a successful scan operation. It cannot be set by the caller. It can only be set by scanning a file. If the virus name property is empty, the file is not infected. FIG. 10 illustrates a means by which the caller can obtain the value of virus name property 124 using variable sVirusName.

As mentioned, scan method 126 may be utilized by virus interface 102 to access features of virus scan engine 104. FIG. 11 discloses an illustrative subroutine whereby the action property 110 is set to 1 (indicating that a file scan for viruses is to be performed), file property 112 is set to "c:\somefile. exe" (indicating that somefile.exe is the file to be scanned), and the scan method is invoked to access the scan feature of virus scan engine 104. As also shown in FIG. 11, if the method call is successful (i.e., result property 120 equals 0), then the values of certain properties (infected, repairable, type and virus name for example) can be retrieved by the caller for further analysis.

The standard return value for method calls in a COM architecture is a result handle (HRESULT). This is a 32-bit value with four sub-sections:

| Bits | Name | Description |
|---|---|---|
| 0–15 | Code | A value that identifies the specific error that occurred. For all HRESULT values returned by VirusInterface, this will either be the run-time error reported by the operating system, or the VSTATUS value reported by VirusScan ™ |
| 16–28 | Facility | The component reporting the error. For all HRESULT values returned by VirusInterface, this will be zero. |
| 29–30 | Reserved | Reserved for future use; always zero. |
| 31 | Severity | Set to 0 for success, 1 for failure. |

VirusInterface will return the value of zero (all bits zero) for all method calls that succeed. Note, however, that in a Visual Basic implementation, HRESULT is not returned directly to the caller. If a method returns a value with a severity error (bit 31 set to 1), Visual Basic will raise an error that must be trapped by the caller, indicating to the caller that the call failed. If no error is raised, then the call succeeded.

VSTATUS, the value returned by a call to the McAfee VirusScan™ engine, can have any of the following illustrative values:

| Symbolic name | Value | Description |
| --- | --- | --- |
| VSTATUS_NOERROR | 0 | Success |
| VSTATUS_ERROR | 1 | General failure |
| VSTATUS_INTERNAL | 2 | Internal VirusScan failure |
| VSTATUS_MEMALLOC | 3 | cell Could not allocate memory |
| VSTATUS_STRUCTMISMATCH | 4 | Structure size mismatch |
| VSTATUS_BADVIRNAME | 5 | Bad virus names file |
| VSTATUS_BADVIRDEF | 6 | Bad virus definitions file |
| VSTATUS_FILEOpEN | 7 | Could not open file |
| VSTATUS_VSDISKREAD | 8 | Disk read error |

In summary then, the interaction between application 100, virus scan interface 102, and virus scan engine is straightforward and efficient. In a Visual Basic implementation, a VirusInterface object is first instantiated. This can be a control placed on a form at design-time, or an object created at run time. Second, the necessary properties are set; this will generally include action property 110 and file property 112, and may include others. Third, a desired method, such as scan method 126 is invoked to utilize a particular feature of virus scan engine 104. Finally, pertinent properties are checked, including result property 120, to determine if the method call succeeded, and if so, the results of that method call.

Various embodiments of the invention have been described. The descriptions are offered by way of illustration, not limitation. Thus, it will be apparent to those skilled in the art that modifications may be made to the invention as described without departing from the scope of the claims set out below.

What is claimed is:

1. A method for allowing a computer program to access features of a virus scan engine, comprising the steps of:

instantiating an object to act as an interface between the computer program and the virus scan engine;

setting at least one property of the object, said at least one property being associated with a predeterminned feature of the virus scan engine to be accessed; and invoking a method of the object, said invocation resulting in access to the predetermined feature of the virus scan engine.

2. The method of claim 1, further comprising the step of examining at least one property of the object after the predetermined feature is accessed.

3. The method of claim 2, wherein said at least one property to be examined comprises a result property.

4. The method of claim 2, wherein said at least one property to be examined comprises a virus name property.

5. The method of claim 1, wherein said at least one property to be set comprises an action property.

6. The method of claim 1, wherein said at least one property to be set comprises a file property.

7. The method of claim 1, wherein said method to be invoked comprises a scan method.

8. The method of claim 1, wherein said object is a component-object-model object implemented as a dynamic link library.

9. An apparatus for allowing a computer program to access a virus scan engine, comprising:

means for instantiating an object to act as an interface between the computer program and the virus scan engine;

means for setting at least one property of the object, said at least one property being associated with a predetermined feature of the virus scan engine to be accessed; and means for invoking a method of the object, said invocation resulting in access to the predetermined feature of the virus scan engine.

10. The apparatus of claim 9, further comprising a means for examining at least one property of the object after the predetermined feature is accessed.

11. The apparatus of claim 10, wherein said at least one property to be examined comprises a result property.

12. The appartus of claim 9, wherein said at least one property to be set comprises an action property.

13. The apparatus of claim 9, wherein said method to be invoked comprises a scan method.

14. The apparatus of claim 9, wherein said object is a component-object-model object implemented as a dynamic link library.

15. A computer-readable medium which can used to allow a computer program to access a virus scanning engine, comprising:

means for instantiating an object to act as an interface between the computer program and the virus scan engine;

means for setting at least one property of the object, said at least one property being associated with a predetermined feature of the virus scan engine to be accessed; and means for invoking a method of the object, said invocation resulting in access to the predetermined feature of the virus scan engine.

16. The computer-readable medium of claim 15, further comprising a means for examining at least one property of the object after the predetermined feature is accessed.

17. The computer-readable medium of claim 16, wherein said at least one property to be examined comprises a result property.

18. The computer-readable medium of claim 15, wherein said at least one property to be set comprises an action property.

19. The computer-readable medium of claim 15, wherein said method to be invoked comprises a scan method.

20. The computer-readable medium of claim 15, wherein said object is a component-object-model object implemented as a dynamic link library.

* * * * *

UNITED STATES PATENT AND TRADEMARK OFFICE
CERTIFICATE OF CORRECTION

PATENT NO. : 6,029,256
DATED : February 22, 2000
INVENTOR(S) : Viktor Kouznetsov It is certified that error appears in the above-identified patent and that said Letters Patent is hereby corrected as shown below:

Drawings,
Sheet 2, Fig. 3, the reference numberal 110 should be applied to the code sample entitled ActionExample (), which should appear as follows:

```
Sub ActionExample ( )
    Dim nAction As Long
    ' set the property
    VirusInterface.Action = 1          ← 110
    ' get the property
    nAction = VirusInterface.Action
End Sub
```
*Fig. 3*

Sheet 2, Fig. 4, the reference numeral 112 should be applied to the code sample entitled FileExample (), which should appear as follows:

```
Sub FileExample ( )
    Dim sFile As String
    ' set the property
    VirusInterface.File = "C:\SomeFile.exe"   ← 112
    ' get the property
    sFile = VirusInterface.File
End Sub
```
*Fig. 4*

Sheet 2, Fig. 5, the reference numeral 114 should be applied to the code sample entitled InfectedExample (), which should appear as follows:

```
Sub InfectedExample ( )
    Dim nInfected As Long
    ' get the property                  ← 114
    nInfected = VirusInterface.Infected
End Sub
```
*Fig. 5*

Sheet 2, Fig. 6, the reference number 116 should be applied to the code sample entitled MoveToPathExample (), which should appear as follows:

```
Sub MoveToPathExample ( )
    Dim sMoveToPath As String

' set the property
    VirusInterface.MoveTopPath = "C:\TopDir\SubDir"   ← 116

' get the property
    sMoveToPath = VirusInterface.MoveToPath
End Sub
```
*Fig. 6*

UNITED STATES PATENT AND TRADEMARK OFFICE
CERTIFICATE OF CORRECTION

PATENT NO.    : 6,029,256
DATED         : February 22, 2000
INVENTOR(S)   : Viktor Kouznetsov It is certified that error appears in the above-identified patent and that said Letters Patent is hereby corrected as shown below:

Drawings con't,
Sheet 2, Fig. 7, the reference numeral 118 should be applied to the code sample entitled RepairableExample (), which should appear as follows:

```
Sub RepairableExample ( )
    Dim nRepairable As Long

' get the property                    ← 118
    nRepairable = VirusInterface.Repairable
End Sub
```
*Fig. 7*

Sheet 3, Fig. 8, the reference numeral 120 should be applied to the code sample entitled ResultExample (), which should appear as follows:

```
Sub ResultExample ( )
    Dim nResult As Long

' get the property                    ← 120
    nResult = VirusInterface.Result
End Sub
```
*Fig. 8*

Sheet 3, Fig. 9, the reference numeral 122 should be applied to the code sample entitled TypeExample (), which should appear as follows:

```
Sub TypeExample ( )
    Dim nType As Long

' get the property                    ← 122
    nType = VirusInterface.Type
End Sub
```
*Fig. 9*

Sheet 3, Fig. 10, the reference number 124 should be applied to the code sample entitled VirusNameExample (), which should appear as follows:

```
Sub VirusNameExample ( )
    Dim sVirusName As String

' get the property                    ← 124
    sVirusName = VirusInterface.VirusName
End Sub
```
*Fig. 10*

UNITED STATES PATENT AND TRADEMARK OFFICE
CERTIFICATE OF CORRECTION

PATENT NO.    : 6,029,256
DATED         : February 22, 2000
INVENTOR(S)   : Viktor Kouznetsov It is certified that error appears in the above-identified patent and that said Letters Patent is hereby corrected as shown below:

Drawings con't,
Sheet 3, Fig. 11, the reference numeral 126 should be applied to the code sample entitled ScanExample (), which should appear as follows:

```
Sub ScanExample ( )
    VirusInterface.Action = 1
    VirusInterface.File = "C:\SomeFile.exe"
    VirusInterface.Scan                          ← 126

If VirusInterface.Result = 0 Then
        ' succeeded
        Infected = VirusInterface.Infected
        Repairable = VirusInterface.Repairable
        Type = VirusInterface.Type
        VirusName = VirusInterface.VirusName
    End If
End Sub
```

*Fig. 11*

Signed and Sealed this

Twenty-third Day of July, 2002

Attest:

JAMES E. ROGAN
Attesting Officer    Director of the United States Patent and Trademark Office